United States Patent [19]

Heynisch et al.

[11] Patent Number: 4,698,818
[45] Date of Patent: Oct. 6, 1987

[54] AIR-COOLED DISCHARGE TUBE FOR AN ION LASER

[75] Inventors: Hinrich Heynisch, Graefelfing; Klemens Huebner, Ottobrunn, both of Fed. Rep. of Germany

[73] Assignee: Siemens Aktiengesellschaft, Berlin and Munich, Fed. Rep. of Germany

[21] Appl. No.: 891,943

[22] Filed: Aug. 1, 1986

[30] Foreign Application Priority Data

Sep. 30, 1985 [DE] Fed. Rep. of Germany ....... 3534844

[51] Int. Cl.⁴ .............................................. H01S 3/04
[52] U.S. Cl. ....................................... 372/34; 372/61; 372/62
[58] Field of Search ....................... 372/61, 62, 34, 35, 372/88

[56] References Cited

U.S. PATENT DOCUMENTS

| 3,622,910 | 11/1971 | Kantrowitz | 372/34 |
| 3,753,144 | 8/1973 | Kearns et al. | 372/35 |
| 4,378,600 | 3/1983 | Hobart | 372/62 |

FOREIGN PATENT DOCUMENTS

| 0163169 | 12/1985 | European Pat. Off. | 372/61 |
| 0163168 | 12/1985 | European Pat. Off. | 372/61 |

Primary Examiner—Leon Scott, Jr.
Attorney, Agent, or Firm—Hill, Van Santen, Steadman & Simpson

[57] ABSTRACT

In a discharge tube for ion lasers, cooling disks and insulator tubes are provided so that laser power is increased and relatively inexpensive ceramic can be used for the insulator tubes. Cooling packets are disposed between the insulator tubes and are composed of metallic cooling disks alternating with spacer disks.

8 Claims, 3 Drawing Figures

AIR-COOLED DISCHARGE TUBE FOR AN ION LASER

BACKGROUND OF THE INVENTION

1. Field of the Invention

The present invention relates to an air-cooled discharge tube for an ion laser having cooling disks arranged coaxially of the discharge tube.

2. Description of the Prior Art

A discharge tube is disclosed in U.S. Pat. No. 3,753,144 in which between each cooling disk is mounted a ceramic tube so that heat is carried from the region of the discharge channel by the cooling disks. The ceramic tubes are of a significantly larger diameter than the discharge channel and are partially protected by shieldings in the form of bushing protrusions against direct irradiation from the discharge channel.

The disclosed structure, however, can only be used for moderate power lasers since the heating caused by the cooling disks of good thermally conductive material, such as copper, causes mechanical stresses which can lead to fracturing of the ceramic insulator tubes. Furthermore, intense heating of the ceramic tubes occurs even if cooling disks are used that have a coeffecient of thermal expansion matched to that of the ceramic tubes since heating of the ceramic tubes leads to maladjustment of the mirrors of the resonator cavity, resulting in a reduction of the laser power, particularly if different regions of the circumference of the ceramic tubes are cooled differently. Deflection of the laser beam, as well as a greater amount of scattering, leads to a reduction in the measured laser power since laser power is usually measured only in a narrowly limited area around the optical axis of the laser.

There is a demand for extremely stable execution of a laser tube and, thus, for larger diameter insulator tubes. However, this leads to nonuniform cooling of the insulator tubes, especially for air-cooled tubes, which results in different expansions of the insulator tubes causing deflection of the laser beam. Some of the difficulties can be overcome by using BeO ceramic to form the insulator tube. However, BeO is expensive and requires special precautionary measures due to its toxicity.

SUMMARY OF THE PRESENT INVENTION

An object of the present invention is to boost the power output possible from an ion laser having a discharge tube with coaxially arranged cooling disks, while simultaneously reducing costs. This and other objects of the present invention are embodied in a discharge tube having cooling packets formed of alternating cooling disks and spacer disks, wherein each of the disks includes a plurality of openings, or recesses, disposed coaxially of the discharge channel of the ion laser discharge tube. By use of the present cooling packets, a considerable portion of the heat to be dissipated is kept from the ceramic insulator tube connecting locations. The heating of the insulator tubes is relatively slight since the recesses in the spacer disks greatly limit the heat transmission from the cooling disks to the insulators. The heating of the insulator tube is, thus, significantly lower than for more compact disks.

Individual cooling disks are formed relatively thin for very fast heat transmission to the ambient air. Recesses in the intermediate disks in the region of the insulator tubes cause the cooling disks to have a relatively high ductility so that insulator tubes can be used which have a coefficient of thermal expansion different from the cooling disks without risk of fracturing the insulator tubes.

Additional protection against heating and damage to the insulator tubes from the laser emission is provided by shielding elements which are applied to the end faces of the cooling packets. The diameter of two opposing shielding elements differs in that they overlap one another in a radial direction and in that the inside diameter of the smaller shielding is considerably larger than the diameter of the discharge channel. A shielding structure thus formed does not heat up impermissibly and enables compensation for manufacturing tolerances without allowing the laser emission to proceed to the insulator tubes when a poor tolerance situation is present. The shieldings are preferably formed in a potlike or bowl-like shape and are soldered or welded to the cooling packets. Such shieldings have a hole concentrically disposed with respect to the discharge channel, the hole having a diameter at least as big as that of the discharge channel.

The cooling disks and spacer disks of the present invention are preferably essentially of copper, the cooling disks being approximately 0.5 mm thick and the spacer disks being approximately 0.6 mm thick. The cooling packets produced therefrom are not difficult to solder in a vacuum-tight fashion to insulator tubes of $Al_2O_3$ ceramic and have adequate ductility to prevent damage to the insulator tubes for frequent temperature changes. Thus, significantly higher laser power can be realized by use of the present invention for the same size discharge channel.

DESCRIPTION OF THE PREFERRED EMBODIMENTS

Figure 1:
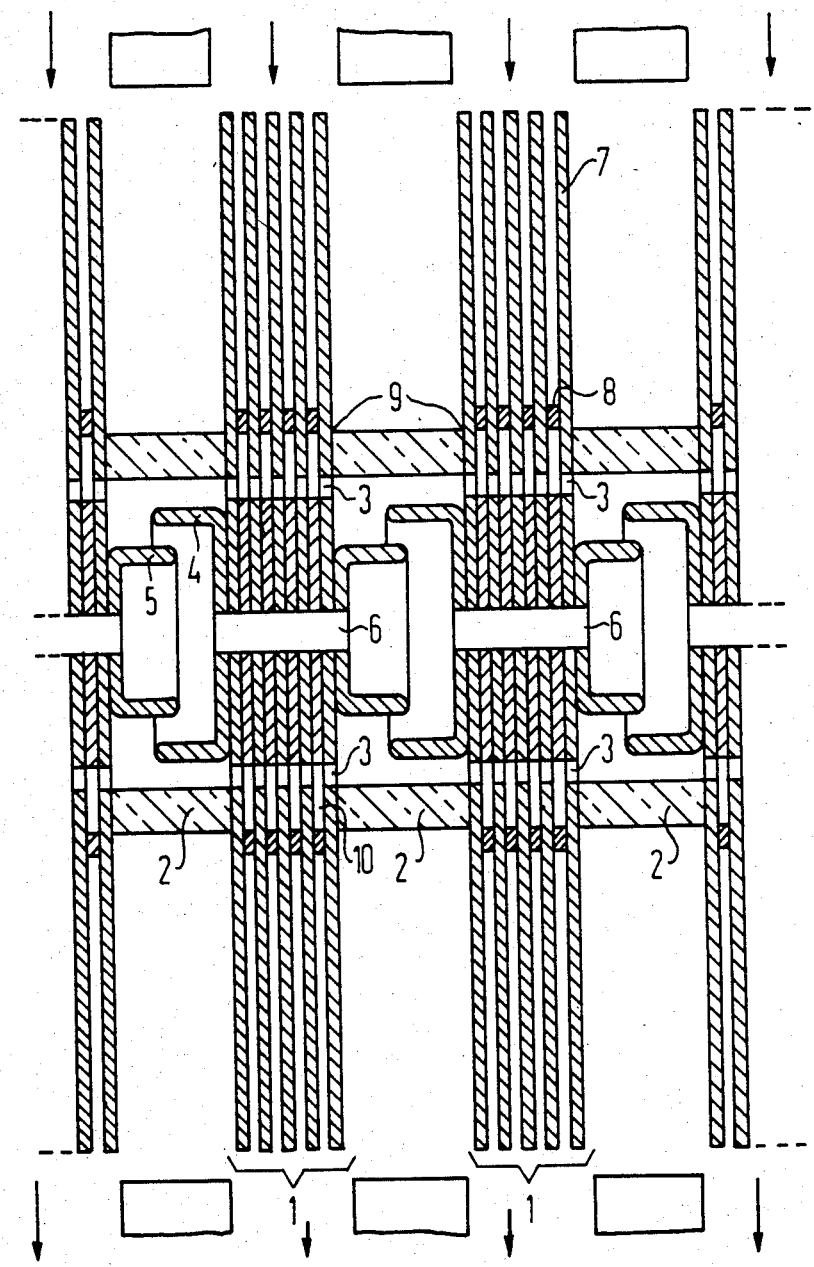
FIG. 1 is a longitudinal cross-section of a discharge tube according to the principles of the present invention.

A discharge tube of an ion laser, such as an argon laser, is shown in FIG. 1 and includes a plurality of cooling packets denoted generally at 1 which are connected to one another in a vacuum-tight fashion by ceramic insulator tubes 2. The cooling packets 1 are composed of cooling disks 7 and spacer disks 8, wherein the cooling disks 7 and spacer disks 8 are welded or soldered to one another in a vacuum-tight fashion. Pot-shaped, or cup-shaped shields 4 and 5 are applied to the two opposite end faces of each cooling packet 1. The shield 4 has a larger diameter and is disposed opposite the smaller diameter shield 5 of a neighboring cooling packet 1. The shields 4 and 5 overlap one another in the direction of a discharge channel 6 to screen away from the insulator tube 2 the emissions of the laser which arise in the discharge channel 6.

Figure 2:
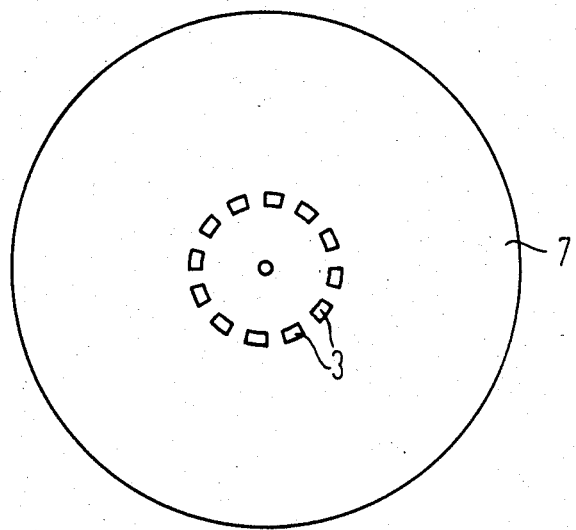
FIG. 2 is a plan view of a cooling disk from the discharge tube of FIG. 1.
Figure 3:
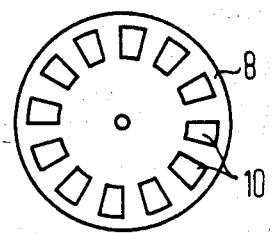
FIG. 3 is a plan view of a spacer disk from the discharge tube of FIG. 1.

The spacer disks 8 shown in FIG. 3 include recesses 10 which overlap recesses 3 formed in the cooling disks 7 shown in FIG. 2. The overlapping recesses 3 and 10 form a return channel for the laser gas. The recesses 3 extend radially outward to the inside wall of the insulator tubes 2, and the recesses 10 extend radially outward at least up to the outside wall of the insulator tubes 2. A plurality of the recesses 3 and 10 are arranged in each respective cooling disk 7 and spacer disk 8 at the same distance from the discharge channel 6. The recesses 3 and 10 are preferably uniformly distributed circumferencially in the disks 7 and 8.

The cooling disks 7 are formed of a ductile material having good thermal conductivity, copper being a particularly good material, and have a thickness of about 0.5 mm. The spacer disks 8 are also of a material having a good thermal conductivity and are preferably formed of either copper or a copper alloy. The spacer disks 8 have a thickness of about 0.6 mm. Different thermal expansions in the region of connecting locations 9 between the insulator tubes 2 and the cooling packets 1 are, thus, accommodated by the ductile material. As a result, the insulator tubes 2 can be formed of stable and relatively inexpensive $Al_2O_3$ ceramic. The perimeter of the cooling disks 7 can have an arbitrary shape, although they are preferably of a circular or rectangular shape.

The present discharge tube is disposed in an air channel and slightly spaced from the channel walls. The air channel preferably includes air shafts with openings corresponding in position and inside diameter to respective ones of the cooling packets 1. Cooling air is thereby either blown or suctioned from between the cooling disks 7 with a high efficiency, as shown in FIG. 1 by the arrows, so that cooling is particularly effective.

In the illustrated embodiment, each cooling packet 1 has five cooling disks 7, the discharge channel 6 has a diameter of 1 mm, the insulator tubes 2 have an inside diameter of 20 mm and an outside diameter of 24 mm and a length of 3 mm. The insulator tubes are formed of $Al_2O_3$ ceramic and the cooling disks 7 and spacer disks 8 are formed of copper. For such embodiment, the laser beam has a 25 $\mu$m tolerance domain given a spacing of 25 cm. Such discharge tube is particularly well suited for high-output argon lasers.

Although modifications and changes may be suggested by those skilled in the art, it is the intention of the inventors to embody within the patent warranted hereon all changes and modifications as reasonably and properly come within the scope of their contribution to the art.

We claim as our invention:

1. An air-cooled discharge tube for an ion laser, comprising:
    cooling packets each having a plurality of metal cooling disks interleaved with metal spacer disks in vacuum-tight fashion,
        each of said cooling and spacer disks having an opening,
            said openings being arranged coaxially to one another in said cooling and spacer disks to form a discharge channel,
    shieldings applied to ones of said cooling disks concentrically with said discharge channel,
    insulator tubes affixed vacuum-tight to end faces of said cooling packets and arranged at least approximately coaxially within said discharge tube,
        an inside diameter of each of said insulator tubes being larger by a multiple than the diameter of said discharge channel and the length of each of said insulator tubes being smaller than the diameter of said insulator tubes,
    said cooling disks and said spacer disks having recesses radially offset relative to the axis of said discharge tube,
        said recesses of neighboring ones of said cooling disks and said spacer disks overlap, a plurality of said recesses in said cooling disks and said spacer disks being disposed at the same distance from the axis of said discharge channel,
        said recesses in said cooling disks extend radially at most up to the inside wall of adjoining ones of said insulator tubes, said recesses in said spacer disks extending radially at least up to an outside wall of adjoining ones of said insulator tubes, and
    mirrors forming a resonator are rigidly mechanically connected to said discharge tube.

2. An air-cooled discharge tube as claimed in claim 1, wherein said shieldings are applied to the end faces of said cooling packets, the diameter of two shieldings disposed opposite one another being different, said oppositely disposed shieldings overlapping one another radially, and a smaller one of said oppositely disposed shieldings having an inside diameter considerably larger than the diameter of said discharge channel.

3. An air-cooled discharge tube as claimed in claim 1, wherein said cooling disks are formed essentially of copper and have a thickness of 0.5 mm,
    wherein said spacer disks are formed essentially of copper and have a thickness of 0.6 mm, and
    wherein said insulator tubes are of $Al_2O_3$ ceramic and are affixed vacuum-tight to said cooling disks.

4. An air-cooled discharge tube as claimed in claim 1, further comprising:
    a cooling channel for passing cooling air perpendicular to said discharge channel and having an inside dimension conforming to the outside dimension of said discharge tube,
        openings in said cooling channel for the cooling air conforming in width and position to the thickness and position of said cooling packets so that a major portion of the cooling air passes through said cooling packets.

5. An air-cooled discharge tube for an ion laser having a discharge channel, comprising:
    a plurality of cooling disks of ductile thermally conductive material and having a first opening disposed coaxially of said discharge channel, said cooling disks each having a plurality of second openings radially offset from the axis of said discharge channel,
    a plurality of spacer disks of ductile thermally conductive material and having a first opening disposed coaxially of said discharge channel, said spacer disks being disposed between adjacent ones of said cooling disks and having a plurality of radially offset second openings overlapping said second openings in said cooling disks,
    said cooling disks and said spacer disks forming a plurality of cooling packets, each of said cooling packets having one of said cooling disks at each of two opposite end faces,
    first and second shielding elements affixed to said opposite end faces of said cooling packets, said first and second shielding elements each having an opening substantially coaxial of said discharge channel, said opening having a diameter at least as large as the diameter of said discharge channel,
    ceramic insulator tubes affixed in vacuum-tight fashion between adjacent ones of said cooling packets substantially coaxially of said discharge channel, said ceramic insulator tubes having a diameter at least as large as said shielding elements, said second openings of said cooling disks extending radially at most to the inside wall of adjoining ones of said ceramic insulator tubes, and said second openings of said spacer disks extending radially at least to the outside wall of said adjoining insulator tubes.

6. An air-cooled discharge tube as claimed in claim 5, wherein said first and second shielding elements each have an annular flange extending outwardly from said opposite end faces of said cooling packets, said annular flange of said first shielding element having a larger diameter than said annular flange of said second shielding element, said first shielding element annular flange extending outwardly from said cooling packet end face to overlap a second shielding element annular flange on an end face of an adjoining one of said cooling packets.

7. An air-cooled discharge tube as claimed in claim 5, wherein each of said plurality of cooling packets includes five cooling disks.

8. An air-cooled discharge tube as claimed in claim 5, wherein said cooling disks are of copper and have a thickness of approximately 0.5 mm, wherein said spacer disks are of a material at least having copper as a component, said spacer disks having a thickness of approximately 0.6 mm, and wherein said ceramic insulator tubes are of $Al_2O_3$ ceramic and have an inside diameter of approximately 20 mm and an outside diameter of approximately 24 mm.

* * * * *